United States Patent [19]

Kubo et al.

[11] Patent Number: 4,914,548

[45] Date of Patent: Apr. 3, 1990

[54] ELECTROLYTIC PAPER FOR ELECTROLYTIC CAPACITOR

[76] Inventors: Yoshiyo Kubo, 43-16, Tsukanohara, Kochi-shi, Kochi-ken; Tetsushi Tamura, 3123-1, Ino-Cho, Agawa-Gun, Kochi-Ken; Tomoko Sasaki, 314-9, Takaoka-Cho, Tosha-Shi, Kochi-Ken, all of Japan

[21] Appl. No.: 191,339

[22] Filed: May 9, 1988

[51] Int. Cl.$^4$ .............................................. H01G 4/16
[52] U.S. Cl. ...................................................... 361/324
[58] Field of Search ................................ 361/311–319, 361/433 E, 433 M:324

[56] References Cited

U.S. PATENT DOCUMENTS

| 2,026,316 | 12/1935 | Kohman | 361/314 X |
| 2,212,836 | 8/1940 | Kohman | 361/324 X |
| 2,913,499 | 11/1959 | Dazzi | 361/317 X |
| 3,707,692 | 12/1972 | Reeder et al. | 361/324 X |
| 4,229,777 | 10/1980 | Merrill et al. | 361/314 |
| 4,740,869 | 4/1988 | Morimoto et al. | 361/433 E |
| 4,762,631 | 8/1988 | Shinozaki et al. | 361/433 E X |

*Primary Examiner*—Donald A. Griffin

[57] ABSTRACT

An electrolytic paper for an electrolytic capacitor interposed between an anode foil and a cathode foil is made of cellulose fiber induced with organic substituent. The inducing reaction of the organic substituent is selected from etherification for hydroxyl group contained in the cellulose fiber, esterification for hydroxyl group contained in the cellulose fiber, or acetalization for hydroxyl group contained in the cellulose fiber. The swelling degree of the electrolytic paper made of this organic substituent induced fiber for electrolyte is increased.

15 Claims, No Drawings

ELECTROLYTIC PAPER FOR ELECTROLYTIC CAPACITOR

BACKGROUND OF THE INVENTION (1) Field of the Invention

The present invention generally relates to an electrolytic capacitor including an anode foil, a cathode foil and an electrolytic paper impregnated with electrolyte, which paper is interposed between these foils. More particularly, the present invention relates to an improvement in such electrolytic paper whose swelling degree for the electrolyte is extremely increased to improve the equivalent series resistance (ESR) of the electrolytic capacitor without generating short-connection troubles.

(2) Description of the Prior Art

Generally, an electrolytic capacitor, particularly an aluminum electrolytic capacitor, is produced by following process. An electrolytic paper is interposed between an anode foil and a cathode foil, and they are wound up. They are immersed in an electrolyte which penetrates the electrolytic paper, and finally their ends are sealed. The electrolyte for this electrolytic capacitor is a solution of ethylene glycol, dimethyl formamide, or the like as solvent and boric acid, ammonium adipic acid, ammonium hydrogen maleate, or the like as solute. The electrolyte penetrates the capacitor element from both of its ends.

The density and thickness of the electrolytic paper has previously been determined to reduce the generation of short-connection troubles during the winding of the capacitor element. Generally, in order to reduce the generation of short-connection trouble during the winding process, the thickness and density of the electrolytic paper are increased. However, its impedance property, especially equivalent series resistance (hereinafter, referred to "ESR"), will become large as the thickness and density are increased. ESR will be primarily worsened in response to the increased thickness, and secondarily worsened in response to the increased density. On the contrary, the density and thickness of the electrolytic paper should be decreased to lower ESR.

The value of CSF according to JIS P8121, representing the degree of pulp resolution, does not affect ESR, but the density is increased in inverse proportion that the value of CSF is lowered. Thus it is difficult to effectively decrease ESR without generating short-connection trouble.

When ethylene glycol is used for the solvent of the electrolyte, this solvent worsens the electrical properties of the electrolytic capacitor at low temperatures, because ethylene glycol has a high viscosity. When dimethyl formamide is used for the solvent of the electrolyte, this solvent improves the electric properties at low temperature but this solvent is remarkably toxic. In recent years, to overcome these problems, $\gamma$-butyrolactone has been used for the solvent of the electrolyte. The electrolyte containing $\gamma$-butyrolactone has low viscosity and low toxicity, thereby improving the electric properties at low temperature and workability.

However, such constituted conventional electrolytic capacitor has a large ESR value rather than a limited value. To avoid this problem, the thickness and density of the electrolytic paper are kept within a specific range which prevents the generation of the short-connection trouble during winding process. After the electrolyte impregnation, the fibers of the electrolytic paper will be expanded and the space between the fibers will be extended if the degree of swelling of the electrolytic paper is remarkably increased by the electrolyte in comparison with conventional swelling. This will essentially decrease the density of the electrolytic paper, and thus ESR will be decreased. The short-connection troubles will not be further generated after the winding work.

In conventional arts, however, ESR has not been improved by the impregnation of electrolyte containing ethylene glycol, dimethyl formamide, or the like as the solvent and conventional arts do not provide effective means for reducing ESR. Although the electrolyte containing $\gamma$-butyrolactone can improve the electrical properties at a low temperature and workability owing to its low viscosity and low toxicity, it worsens ESR. Since the electrolyte containing $\gamma$-butyrolactone has a poor hydrophilic property in comparison with the other conventional electrolyte, the cellulose fiber of the electrolytic paper is not swelled after swelling process. Thus the density of the electrolytic paper is not decreased. Particularly, the electrolytic capacitor for voltages of 50 V or more is desirably made of an electrolytic paper having a density of 0.6 g/cm$^3$ or more, in order to reduce the generation of short connection trouble and improve its pressure resisting property. The fibers of such high density electrolytic paper are tightly engaged with each other through their hydrogen bonds, and are not swelled by the electrolyte containing $\gamma$-butyrolactone so that such type electrolytic capacitor increases ESR. In order to overcome these problems, conventional electrolytic capacitors have included a mixture of $\gamma$-butyrolactone, ethylene glycol, dimethyl formamide, and/or water, and an electrolytic paper having as low a density as possible. But they have satisfactorily decreased the ESR.

SUMMARY OF THE INVENTION

With these problems in mind, it is an object of the present invention to provide an improved electrolytic paper for an electrolytic capacitor without generating short-connection troubles and with improved ESR.

Another object of the present invention is to provide an improved electrolytic paper which is adapted for various electrolytes.

A further object of the present invention is to provide an improved electrolytic paper which can increase its degree of swelling for the electrolyte including $\gamma$-butyrolactone.

To accomplish the above objects, the electrolytic paper, impregnated with electrolyte according to the present invention, interposed between an anode foil, and a cathode foil comprises cellulose fibers having organic substituents to increase the swelling degree for the electrolyte. The electrolyte includes at least one solvent selected from $\gamma$-butyrolactone, dimethyl formamide, and ethylene glycol. The organic substituents are provided by an etherification reaction, esterification reaction or acetalification reaction for the hydroxyl group contained in the cellulose fiber. Preferably, the electrolytic paper has a swelling degree of 5% or more for the electrolyte containing $\gamma$-butyrolactone.

In an electrolytic capacitor comprising an anode foil, a cathode foil and an electrolytic paper produced according to the present invention, the swelling degree of the electrolytic paper for the impregnated electrolyte becomes extremely high, and thus the fibers of the electrolytic paper are expanded and the space between the fibers is extended. This results in decreasing the density and the ESR. Further, the electrolytic capacitor can be free from increased short-connection troubles, because the electrolyte impregnation has been wound is conducted after the element winding work. Accordingly, the density and thickness of the electrolytic capacitor can be so increased as to withstand high voltages and to decrease the generation of short-connection troubles, and further ESR of the electrolytic capacitor can be reduced under a required value.

Other and further objects of this invention will become obvious upon an understanding of the embodiments about to be described or will be indicated in the appended claims, and various advantages not referred to herein will occur to one skilled in the art upon employment of the invention in practice.

DETAILED DESCRIPTION OF THE PREFERRED EMBODIMENTS

Hereinafter, the present invention will be explained in detail with reference to various embodiments.

The present invention is based on the basic knowledge that cellulose fibers of an electrolytic paper provided with organic substituents are extremely swelled by an electrolyte.

An electrolytic paper used in the present invention is mainly composed of cellulose, such as wood pulp fibers produced from needle leaf trees and broad leaf trees, non-wood pulp fibers produced from manila hemp, various hemps and esparto, and reproduced cellulose fibers such as viscose rayon, cupra rayon and the like. These cellulose fibers contain many hydroxyl groups (OH) and fibrils of the fiber are strongly connected through hydrogen bonds existing between the hydroxyl groups. Even when such cellulose fibers are immersed in an hydrophobic solvent such as γ-butyrolactone, the solvent can not enter into the hydrogen bonds formed between the fibrils. Thus, the fiber is almost not swelled. In commonly used paper, the cellulose fibers of the paper are entangled with each other, and each entangled section is strongly engaged through hydrogen bonds.

In order to improve the swelling degree of the paper, the cellulose fibers are provided with organic substituents which are familiar with various electrolytes, especially γ-butyrolactone used as the solvent. The organic substituents allow the electrolyte to enter the hydrogen bonded sections. The fibers are swelled by the electrolyte and the bonding strength of the engagements between the fibers is weakened by the electrolyte.

The chemical reaction for inducing the organic substitution can be selected from all reactions of cellulose, such as graft polymerization for cellulose, the substitution reaction of the hydroxyl group in the cellulose, and the like. The esterification reaction of the hydroxyl group contained in the cellulose, etherification reaction of hydroxyl group, and the acetalization reaction of the hydroxyl group are preferable because these reactions are easily conducted. In these reactions, the cellulose fibers should be maintained in the same configuration from pre-reaction to post-reaction, and prevented from dissolving excessively into the electrolyte. Accordingly, the reaction for inducing the organic substitution should be conducted under soft condition rather than the generally conducted reaction for producing cellulose derivatives. Further, it is desirable to set the reaction conditions to partially substitute the hydroxyl group contained in the cellulose. For example, if at least 50% of the hydroxyl groups are to be substituted, the resultant fiber will be weak or the fiber structure will be broken so that an electrolytic paper will not be formed. If this fiber is to be assembled into an electrolytic capacitor, the fiber will be dissolved into the electrolyte. This will cause the short-connection trouble and increase ESR as the viscosity of electrolyte will increase.

The conditions of the organic substituent inducing reaction should be determined to ensure an optimum swelling degree for a predetermined ESR value.

The substituent to be introduced into the cellulose fiber is selected from any substituent which does not contain corrosion elements for the electrolytic capacitor such as chlorine, bromine, and iodine. But when the substituent has many carbons, such as alkyl groups and allyl groups whose carbon number is at least 8 are substituted, the cellulose fiber will become hydrophobic. The electrolytic paper made of this cellulose fiber will have poor strength and thus may cause troubles during the element winding. On the other hand, when the substituent includes dissociative polar groups, such as a carboxyl group (—COOH), a sulfonic acid group (—SO$_3$H), and the like, and fewer carbons are substituted, the cellulose fiber will the poor in its swelling degree. Thus organic subststituents should be selected to adapt for the degree of polarity or hydrophilic tendency of the electrolyte used inthe electrolytic capacitor.

Preferable organic substituents are selected from alkyl groups bonded with at least one hydroxyl group, ether groups, amino groups, nitrile groups, amide groups, imide groups, or carbonyl groups. Such substituents have a moderate polarity. When the substituent consists of only an alkyl group, such substuent is preferably composed of five carbons or less.

Following examples are more preferable cases.
(A) Esterification reaction
(1) Reaction with acid chloride;

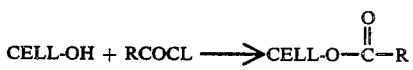

(2) Reaction with acid anhydride;

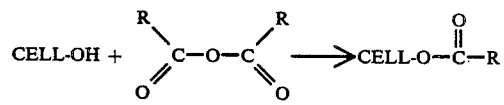

(3) Reaction with isocyanate;

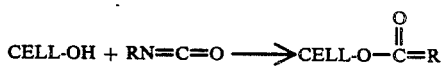

wherein R represents CH$_3$, C$_2$H$_5$, or C$_3$H$_7$, and CELL represents a cellulose chain.
(B) Etherification reaction
(4) Reaction with alkyl halide;

(5) Reaction with di-alkyl sulfate;

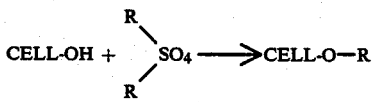

wherein R represents CH$_3$, C$_2$H$_5$, or C$_3$H$_7$, and CELL represents a cellulose chain.

(6) Reaction with alkylene oxide:

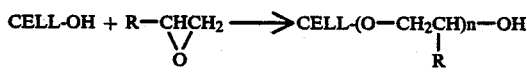

wherein R represents H, CH$_3$ or C$_2$H$_5$, and "n" represents an integral number of 1 or more. CELL represents a cellulose chain.

(7) Reaction with a vinyl compound;

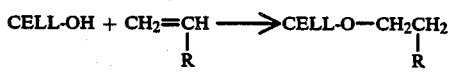

wherein R represents CN, CONH$_2$, OC$_2$H$_5$, or NH$_2$ and CELL represents a cellulose chain.

(C) Acetalification reaction

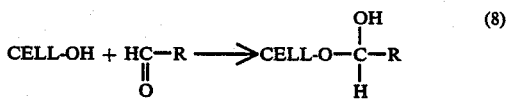

wherein R represents CH$_3$, C$_2$H$_5$, C$_3$H$_7$ or C$_4$H$_9$, and CELL represents a cellulose chain.

As mentioned above, a part of hydroxyl groups (OH) in the cellulose is substituted by the above described substituents by using (A) esterification reaction, (B) etherification reaction, or (C) acetalification reaction.

The electrolytic paper for the present invention is not limited only to papers which are made only of cellulose fibers provided with the organic substituent, but is also selected from various papers which are made of a mix of the organic substituent fiber and ordinary cellulose fibers, or chemical fibers, such as polypropylene fiber, polyester fiber, and the like. In this invention, it is required that the electrolytic paper essentially includes the cellulose fiber which is provided with organic substituent.

In order to produce the electrolytic paper of the present invention, the organic substituent may be introduced into the cellulose fiber of the ordinarily formed paper by means of a low temperature plasma reaction or a radiation induced graft polymerization. Further the reacted cellulose fiber should be thoroughly washed to remove any by-product formed by the organic substituent reaction and reaction auxiliaries which cause corrosion of the electrolytic capacitor. Therefore, it is desirable to introduce the organic substituent into the cellulose fiber prior to it being formed into electrolytic paper.

The method of forming the paper is not limited, so that it can be selected from hand paper forming, and various mechanical processes, such as on a circular net paper forming machine, a long net paper forming machine, and the like.

The electrolytic paper according to the present invention is remarkably swelled in the electrolyte, and its fiber density is essentially lowered, so that ESR of the resultant electrolytic capacitor can be decreased. Accordingly, the value of the ESR depends on the high density electrolytic paper. If the electrolytic capacitor is made of a low density electrolytic paper for example, 0.3 g/cm$^3$ or less, the value of the ESR will be less. In the present invention a, desirable density of the electrolytic paper is 0.3 to 1.0 g/cm$^3$.

When the cellulose fiber is excessively swelled, the fiber will be partially dissolvd into the electrolyte and its viscosity will become high. To avoid increasing the viscosity and lowering the density of the electrolytic paper, so that the ESR is decreased effectively, the preferable electrolytic paper has a swelling degree of at least 5% and a solubility of 15% or less for the electrolyte containing $\gamma$-butyrolactone.

Hereinbelow, various embodiments for preparing the electrolytic paper according to the present invention will be described in detail and the swelling degree, solubility and ESR of the electrolytic paper prepared in each embodiment will be shown. The resulted values were obtained by the following measuring methods and measuring devices.

(1) Thickness, Density, Tensile Strength

Thickness, density, and tensile strength were measured by the method referred to in JIS C 2301(Electrolytic Capacitor).

(2) Swelling Degree

Ten sheets of electrolytic paper were piled to form a test piece. Thickness (A$\mu$m) of the test piece was measured by a micrometer, and was exactly immersed in $\gamma$-butyrolactone, or a predetermined electrolyte for 15 min. The test piece was taken out of the above solution and kept in the wetted state. Then its thickness was measured by the micrometer. The resulting thickness represents B $\mu$m. The micrometer referred to in JIS C 2301 was used and the swelling degree was calculated by the following equation:

$$\text{Swelling Degree (\%)} = \frac{B - A}{A} \times 100$$

(3) Solubility

A piece (about 2 g) of electrolytic paper was prepared as a test piece. The test piece was dried at 105° C. until its weight no longer changed. This weight (C g) was correctly measured and then the piece immersed in $\gamma$-butyrolactone, or a predetermined electrolyte for 24 hours at 25° C. The immersed test piece was filtered by a wire gauze having 200 mesh, and the filtered test piece on the wire gauze was washed with an ion exchanged water. The test piece was dried again at 105° C. until its weight no longer changed. This weight (D g) was correctly measured and the solubility was calculated by the following equation:

$$\text{Solubility (\%)} = \frac{C - D}{C} \times 100$$

(4) ESR (equivalent series resistance)

An electrolytic paper impregnated with electrolyte was inserted between chromium plated stainless electrodes, whose diameter was 38 mm as determined with a micrometer. The ESR was measured by an LCR meter with a frequency of 1000 HZ at $-40°$ C. The electrolyte was $\gamma$-butyrolactone or boro-disalicylic acid ammonium solved in a predetermined solvent to achieve a specific resistance of 200$\Omega$ cm at 20° C.

EMBODIMENT 1

100 g of needle leaf tree wood pulp was thoroughly mixed with 250 ml of 2.5 % NaOH solution. Then 100 g of acrylonitrile was added to it and slowly mixed at room temperature for 2 hours to achieved cyanoethylization of the needle leaf tree wood pulp. The resulting wood pulp was thoroughly washed with ion exchanged water and broken by a PFI mill until the broken degree reached to CSF 650 ml. This broken material was used to make a paper sheet having a thickness of 50.2 μm and density of 0.398 g/cm$^3$ by hand. This paper sheet was used as an a electrolytic paper.

EMBODIMENT 2

100 g of Manila hemp pulp was thoroughly mixed with 250 ml of 5.0% NaOH solution . Then 100 g of acrylonitrile was added to it and slowly mixed at 20° C. for 2 hours to perform cyanoethylization of the Manila hemp pulp. The resulting Manila hemp pulp was thoroughly washed with ion exchanged water and broken by a PFI mill until the broken degree reached CSF 430 ml. This broken material was used to make a paper sheet having a thickness of 59.6 μm and density of 0.604 g/cm$^3$ by hand. This paper sheet was used as an electrolytic paper.

EMBODIMENT 3

30 g of Manila hemp pulp was subjected to cold alkali treatment with 500 ml of 10% NaOH solution. The resulting solution was centrifuged to remove excess any NaOH solution to prepare the pulp solution to 35%. This prepared pulp was divided into fine pieces and the divided pies were put into a stainless container. The air in the container was replaced by nitrogen gas and 30 ml of propylene oxide was added into the container. Then the container was sealed and subjected to heating at 50° C. for 30 min. to perform the hydroxypropylization of the Manila hemp pulp. The reacted pulp was sufficiently washed with ion exchanged water. The washed pulp was used to make a paper sheet having a thickness of 60.3 μm and a density of 0.507 g/cm$^3$ by hand. This paper sheet was used as an electrolytic paper.

EMBODIMENT 4

20 kg of cyanothylized Manila hemp pulp prepared in the same manner as Embodiment 2 was mixed with 80 kg of Manila hemp pulp, and ion exchanged water was added into it to prepare a slurry having a concentration of 3.5% This slurry was broken by a double-discrefiner until the broken degree reached to CSF 5 ml or less. This broken material was used to make a paper sheet having thickness of 20.4 μm and density of 0.860 g/cm$^3$. The paper was formed on a long net paper forming machine. This paper sheet was used as an electrolytic paper.

EMBODIMENT 5

50 g of Manila hemp pulp and 50 g of needle leaf tree wood pulp were thoroughly mixed with 250 ml of 2.5% NaOH solution. Then 100 g of acrylonitrile was added in it and slowly mixed at 20° C. for 2 hours to perform a cyanoethylization of the mixed pulp. The reacted pulp was sufficiently washed with ion exchanged water and broken by a PFI mill until broken degree reached CSF 600 ml. This broken material was used to make a paper sheet having thickness of 60.1 μm and a density of 0.508 g/cm$^3$ by hand. This paper sheet was used as an electrolytic paper.

EMBODIMENT 6

50 g of Manila hemp pulp and 50 g of needle leaf tree wood pulp were cyanoethylized in the same manner as Embodiment 5 and ion exchanged water was added to form a slurry having a concentration of 3.2%. This slurry was broken by a beater until the broken degree reached CSF 650 ml. This broken material was used to make a paper sheet having a thickness of 60.5 μm and density of 0.505 g/cm$^3$. The paper was formed on a circular net paper forming machine. This paper sheet was used as an electrolytic paper.

EMBODIMENT 7

30 g of Manila hemp pulp was immersed in 500 ml of 10% NaOH solution to perform a cold alkali treatment. This treated pulp was centrifuged to remove excess NaOH solution in order to prepare a pulp concentration of 35%. This pulp was divided into fine pieces and the divided pieces were put into a stainless container. The air in the container was replaced by nitrogen gas and 20 ml of 1,2-butylene oxide was added into the container. Then the container was sealed and subjected to heating at 70° C. for 50 min. to perform the hydroxybutylization of the Manila hemp pulp. The reacted pulp was sufficiently washed with ion exchanged water. The washed pulp was used to make a paper sheet having a thickness of 60.3 μm and a density of 0.502 g/cm$^3$ by hand. This paper sheet was used as an electrolytic paper.

EMBODIMENT 8

500 ml of acetic anhydride was added to 50 g of Manila hemp pulp and stirred at 120° C. for one hour to achieve the acetylization of Manila hemp pulp. This reacted pulp was sufficiently washed with ion exchanged water and used to make a paper sheet having a thickness of 59.7 μm and a density of 0.503 g/cm$^3$ by hand. This paper sheet was used as an electrolytic paper.

EMBODIMENT 9

50 g of Manila hemp pulp was added to 100 ml of acetic anhydride, 400 ml of acetic acid, and 0.5 g of sulfuric acid, and stirred at 50° C. for 15 min. to achieve the acetylization of Manila hemp pulp. This reacted pulp was sufficiently washed with ion exchanged water and use to make a paper sheet having a thickness of 60.5 μm and a density of 0.495 g/cm$^3$ by hand. This paper sheet was used as an electrolytic paper.

In addition to the above embodiments 1 through 9, conventional electrolytic papers without organic substituent were made by conventional means to compare the present invention with the prior art.

CONVENTIONAL EXAMPLE 1

Needle leaf tree wood pulp was broken by a PFI mill until the broken degree reached CSF 650 ml. The broken pulp was used to make a paper sheet having a thickness of 49.7 μm and a density of 0.397 g/cm$^3$ by hand. This paper sheet was used as an electrolytic paper. This electrolytic paper had substantially the same broken degree, the same thickness, and the same density as the paper prepared pursuant to Embodiment 1.

CONVENTIONAL EXAMPLE 2

Manila hemp pulp was broken by a PFI mill until the broken degree reached CSF 430 ml. The broken pulp was used to make a paper sheet having a thickness of 60.6 μm and a density of 0.601 g/cm³ by hand. This paper sheet was used as an electrolytic paper. This electrolytic paper had substantially the same broken degree, the same thickness, and the same density as the paper prepared pursuant to Embodiment 2.

CONVENTIONAL EXAMPLE 3

Manila hemp pulp was broken by a beater until the broken degree reached CSF 660 ml. The broken pulp was used to make a paper sheet having a thickness of 60.2 μm and a density of 0.507 g/cm³. The paper was formed on a circular net paper forming machine. This paper sheet was used as an electrolytic paper. This electrolytic paper had substantially the same thickness and the same density as the paper prepared pursuant to Embodiment 3.

CONVENTIONAL EXAMPLE 4

Manila hemp pulp was broken by a double-discrefiner until the broken degree reached CSF 5 ml. The broken pulp was used to make a paper sheet having thickness of 20.2 μm and density of 0.855 g/cm³. The paper was formed on a long net paper forming machine. This paper sheet was used as an electrolytic paper. This electrolytic paper had substantially the same thickness and the same density as the paper prepared pursuant to Embodiment 4.

The electrolytic papers prepared pursuant to Embodiments 1 through 9 and the conventional electrolytic papers prepared pursuant to Conventional Examples 1 through 4 were measured for their thickness, density, tensile strength, ESR, solubility, swelling degree for γ-butyrolactone, and swelling degree for other solvents.

The results are shown in Table 1.

electrolytic paper to essentially decrease, therefore the ESR is extremely improved. For example, the paper of Embodiment 1 has substantially the same thickness and density: 50.2 μm and 0.398 g/cm³ of Embodiment 1 vs 49.7 μm and 0.397 g/cm³ of Conventional Example 1. The swelling degree for γ-butyrolactone of Conventional Example 1 indicates 0.3%, and that of Embodiment 1 indicates 68.1%. This result confirms that the electrolytic paper of the present invention is improved in its swelling degree. The ESR value of Conventional Example 1, 10.5 Ω, is decreased to 6.1 Ω in Embodiment 1. The swelling degree for other electrolytes, such as ethylene glycol, in Embodiment 1 indicates 41.3% which is extremely increased compared to Conventional Example 1 which indicates 27.5%.

Although the electrolytic paper prepared by Embodiment 2 has the same density and thickness as that of Conventional Example 2, the swelling degree for γ-butyrolactone of Embodiment 2 is much higher than that of Conventional Example 2; namely 91.0% vs 0.2%. This results in improved ESR; namely from 37.4 Ω to 6.2 Ω.

The swelling degree for γ-butyrolactone of Embodiment 3 is higher than that of Conventional Example 3; namely 5.2% vs 0.3%. Although this increment is low in comparison with Embodiments 1 and 2, the ESR of Embodiment 3 is decreased; namely from 9.7 Ω to 6.8 Ω. Embodiment 3 establishes that sufficient change can be realized only by 5% of the swelling degree for γ-butyrolactone.

Embodiments 7 and 8, whose density and thickness are essentially the same as the electrolytic paper of Embodiment 3, indicate the swelling degree for γ-butyrolactone to be 6.2% and 7.8%, and superior results of ESR; namely 5.9 Ω and 5.4 Ω, respectively.

Embodiments 5 and 6, whose density and thickness are essentially the same as the electrolytic paper of Embodiment 3, indicate the swelling degree for γ-butyrolactone to be 85.8% and 77.6% which, are much larger than that of Embodiment 3. The ESR of Embodi-

TABLE 1

| | Thickness (μm) | Density (g/cm³) | ESR (Ω) | Solubility (%) | Swelling Degree (%) | | | | | | Tensile Strength (kg) |
| --- | --- | --- | --- | --- | --- | --- | --- | --- | --- | --- | --- |
| | | | | | γ-butyro-lactone | dimethyl formamide | ethylene glycol | methyl cellulose | propylene glycol | propylene carbonate | |
| EMBODIMENT | | | | | | | | | | | |
| 1 | 50.2 | 0.398 | 6.1 | 3.8 | 68.1 | 84.1 | 41.3 | 60.5 | 6.8 | 54.3 | 0.6 |
| 2 | 59.6 | 0.604 | 6.2 | 3.8 | 91.0 | 123.2 | 40.0 | 66.2 | 15.8 | 51.2 | 3.8 |
| 3 | 60.3 | 0.507 | 6.8 | 2.2 | 5.2 | 130.2 | 70.5 | 80.8 | 25.3 | 10.8 | 2.5 |
| 4 | 20.4 | 0.860 | 68.7 | 2.5 | 28.8 | 67.3 | 30.7 | 21.4 | 4.3 | 8.5 | 2.1 |
| 5 | 60.1 | 0.508 | 4.2 | 3.5 | 85.8 | 95.1 | 38.6 | 66.8 | 6.2 | 49.2 | 1.5 |
| 6 | 60.5 | 0.505 | 5.5 | 3.5 | 77.6 | 84.1 | 37.9 | 60.7 | 10.2 | 44.8 | 2.1 |
| 7 | 60.3 | 0.502 | 5.9 | 2.3 | 6.2 | 105.5 | 64.2 | 73.4 | 20.6 | 15.4 | 2.6 |
| 8 | 59.7 | 0.503 | 5.4 | 4.6 | 7.8 | 62.7 | 35.6 | 20.2 | 5.0 | 5.3 | 1.8 |
| 9 | 60.5 | 0.495 | 6.4 | 14.2 | 81.5 | 140.0 | 35.3 | 51.2 | 6.2 | 33.5 | 0.7 |
| C. EXAMPLE | | | | | | | | | | | |
| 1 | 49.7 | 0.397 | 10.5 | 3.5 | 0.3 | 49.1 | 27.5 | 15.2 | 0.2 | 0.2 | 0.7 |
| 2 | 60.0 | 0.601 | 37.4 | 2.2 | 0.2 | 52.1 | 28.0 | 11.9 | 0.1 | 0.1 | 4.1 |
| 3 | 60.2 | 0.507 | 9.7 | 2.2 | 0.3 | 53.8 | 30.2 | 14.7 | 0.1 | 0.1 | 2.8 |
| 4 | 20.2 | 0.855 | 980.0 | 2.2 | 0.2 | 53.8 | 30.2 | 14.7 | 0.1 | 0.1 | 2.2 |

Note: Chemical Reaction
Cyanoethylization: Embodiments 1, 2, 4, 5, 6
Acetylization: Embodiments 8, 9
Hydroxy propylization: Embodiment 3
Hydroxy butylization: Embodiment 7
Non-Treatment: C. Example 1, 2, 3, 4

As is clear from the results shown in Table 1, the electrolytic papers made from a cellulose fiber having an organic substituent according to the present invention has a large swelling degree for γ-butyrolactone and other various solvents. This causes the density of the ments 5 and 6 are decreased to 4.2 Ω and 5.5 Ω in response to the increment of the swelling degree. This fact confirms that the ESR is improved as the swelling degree is increased to lower the density of the electrolytic paper.

The swelling degree for γ-butyrolactone of Embodiment 4 is higher than that of Conventional Example 4; namely 28.8% vs 0.2%. Accordingly, the ESR of Embodiment 4 is decreased; from 980.0 Ω to 68.7 Ω.

Table 1 also indicates that the swelling degree for the other electrolytes, such as di-methyl formamide, ethylene glycol, methyl cellsolube, propylene glycol, propylene carbonate, and so on are improved.

The solubility of the papers of Embodiments 1 through 8 are restricted within the range of 2.2% to 4.6%, but their ESR are extremely improved in comparison with Conventional Examples. This confirms that the solubility is not so increased and the ESR is not affected by such solubility in the present invention. Although the solubility of Embodiment 9 is extremely high, 14.2%, in comparison with the other Embodiments, the ESR of Embodiment 9 is 6.4 Ω which is by no means inferior to the electrolytic paper of the other Embodiments having the substantially same thickness and density, and superior to Conventional Examples. Consequently, a solubility of 15% or less is effective for improving ESR.

If the tensile strength of the electrolytic paper having the organic substituent is decreased, the electrolytic paper will be easily torn and thus the electrolytic capacitor will cause troubles. In the present invention, desirable tensile strength is at least 0.5 kg.

Comparative test between the samples corresponding to Embodiments 1 through 4 and the conventional samples corresponding to Conventional Examples 1 through 4 was conducted to measure their ESR by using various electrolytes, including borodi-salycilic acid with ammonium as a solute and mixed solvent of γ-butyrolactone, and ethylene glycol, di-methyl formamide or water to prepare its specific resistance to 200 Ω cm (20° C.). The results of these comparative tests is shown in Table 2.

through 4 are remarkably increased in comparison with Conventional Examples 1 through 4.

As explained above, the electrolytic paper for preparing an electrolytic capacitor according to the present invention is made of a cellulose fiber having an organic substituent which increases its swelling degree for an electrolyte. The cellulose fiber is expanded with the electrolyte during the electrolyte impregnation process. This makes the space between the fibers become wide and the density of the electrolytic paper becomes essentially low, thereby decreasing ESR. This effect can be generated when the electrolyte is composed of various solvents such as ethylene glycol or mixture thereof. Especially, γ-butyrolactone, which is poor in hydrophilic property and ESR, can be used as the solvent of the electrolyte and as superior an effect can be obtained as with the other solvents.

The electrolytic paper according to the present invention can provide a superior electrolytic capacitor having improved pressure resisting property, in addition to decrement of ESR. Further the short-connection trouble can be further decreased by the present invention. Even if the electrolytic paper having a high density or a low CSF value to decrease short-connection trouble is used, the cellulose fiber of the electrolytic paper will be swelled with the impregnated electrolyte, and thus its density will become essentially low whereby ESR is not affected.

The electrolytic capacitor having the electrolytic paper according to the present invention may extend is usable life, because the electrolytic paper can be free from drying up of the electrolyte impregnated therein.

As many apparently widely different embodiments of this invention may be made without departing from the spirit and scope thereof, it is to be understood that the invention is not limited to the specific embodiments thereof except as defined in the appended claims.

What is claimed is:

1. A paper for being disposed between the anode and the cathode of an electrolytic capacitor, comprising:
   (a) cellulose fibers having at least some of the hydroxyl groups thereof substituted by organic substituents so that hydrogen bonding between adjacent fibers is reduced and the swelling degree attributable to an impregnating electrolyte is increased.

2. The paper of claim 1, wherein:
   (a) said organic substituents having been substituted in the course of a chemical reaction selected from the group consisting of etherification, esterification and acetalization.

3. The paper of claim 2, wherein:

TABLE 2

| | ESR (Ω) | | | | |
|---|---|---|---|---|---|
| | BLO 100% | BLO 80% + EG 20% | BLO 50% + EG 50% | BLO 50% + DMF 50% | BLO 90% + H₂O 10% |
| EMBODIMENT 1 | 6.1 | 7.2 | 8.5 | 4.5 | 5.8 |
| C. EXAMPLE 1 | 10.5 | 13.2 | 15.3 | 9.4 | 10.0 |
| EMBODIMENT 2 | 6.2 | 8.6 | 7.3 | 3.8 | 6.1 |
| C. EXAMPLE 2 | 37.4 | 33.8 | 32.5 | 15.2 | 32.9 |
| EMBODIMENT 3 | 6.8 | 6.5 | 7.1 | 4.2 | 6.7 |
| C. EXAMPLE 3 | 9.7 | 10.0 | 12.8 | 6.9 | 9.1 |
| EMBODIMENT 4 | 68.7 | 42.7 | 35.8 | 12.8 | 50.8 |
| C. EXAMPLE 4 | 980.0 | 811.0 | 136.0 | 154.0 | 762.0 |

EG: ethylene glycol
DMF: di-methyl formamide
BLO: γ-butyrolactone

As is clear from Table 2, the cellulose fiber having organic substituent provides the same effect for various electrolytes mixed with γ-butyrolactone as with γ-butyrolactone used alone. For example, the ESR of Embodiment 1 for the electrolyte whose solvent is the mixture of 50% of γ-butyrolactone and 50% of ethylene glycol is lower than that of Conventional Example 1, 8.5 Ω vs 15.3 Ω. The electrolytic paper of Embodiment 1 has substantially the same thickness and density as that of Conventional Example 1. Also, ESR of Embodiment 4 is lowr than that of Conventional Example 4 namely 35.8 Ω vs 136.0 Ω. That is, the ESRs of Embodiments 1

(a) said organic substituents having an affinity for an electrolyte selected from the group consisting of γ-butyrolactone, di-methyl formamide, ethylene glycol, methyl cellsolube, propylene glycol, propylene and mixtures thereof.

4. The paper of claim 2, wherein:
(a) said esterification reaction has a first reactant selected from the group consisting of acid chloride, acid anhydride and isocyanate.

5. The paper of claim 2, wherein:
(a) said etherification reaction has a first reactant selected from the group consisting of alkyl halide, dialkyl sulfate, alkylene oxide and vinyl compounds.

6. The paper of claim 2, wherein:
(a) said acetalization reactant has as a reactant where R is an alkane.

7. The paper of claim 1, wherein:
(a) the swelling degree is at least 5% when butyrolactone is the electrolyte.

8. The paper of claim 1, wherein:
(a) said organic substituents preventing corrosion of the capacitor.

9. The paper of claim 1, wherein:
(a) said organic substituents include an alkyl group bonded with a member selected from the group consisting of hydroxyl, ether, ammino, nitrile, amide and carbonyl groups.

10. The paper of claim 9, wherein:
(a) said organic substituents having a moderate polarity.

11. The paper of claim 1, wherein:
(a) said organic substituents being selected from the group consisting of alkyl groups having five or fewer carbons.

12. The paper of claim 1, wherein:
(a) said organic substituents being substituted by a process selected from the group consisting of low temperature plasma reactions and radiation induced graft polymerization.

13. The paper of claim 1, wherein:
(a) said cellulose fibers being selected from the group consisting of needle leaf tree fiber, broad leaf tree fiber, manila hemp, esparato, viscose rayon, cupra rayon and mixtures thereof.

14. The paper of claim 1, wherein:
(a) no more than 50% of the hydroxyl groups are substituted with said organic substituents.

15. The paper of claim 1, wherein:
(a) said organic substituents being selected from the group consisting of acrylonitrile, propylene oxide, 1,2-butylene oxide, and acetic anhydride.

* * * * *